US005568405A

United States Patent [19]

Easton et al.

[11] Patent Number: 5,568,405
[45] Date of Patent: Oct. 22, 1996

[54] DEVICE TO MEASURE AND PROVIDE DATA FOR PLANT POPULATION AND SPACING VARIABILITY

[75] Inventors: Dan T. Easton, Bagley; David J. Easton, Cedar Falls, both of Iowa

[73] Assignee: Easton Goers, Inc., Bagley, Iowa

[21] Appl. No.: 344,077

[22] Filed: Nov. 23, 1994

[51] Int. Cl.⁶ .................................................. G01B 5/16
[52] U.S. Cl. .......................................................... 364/561
[58] Field of Search .......................... 364/561, 424.07; 172/5, 6; 47/1, 7, 1.43, 17, 58; 111/200; 56/121.4–121.46, 10.20

[56] References Cited

U.S. PATENT DOCUMENTS

| | | | |
|---|---|---|---|
| 4,225,930 | 9/1980 | Steffen | 364/555 |
| 4,823,268 | 4/1989 | Giles et al. | 364/424.07 |
| 5,222,324 | 6/1993 | O'Neall et al. | 47/1.7 |
| 5,296,702 | 3/1994 | Beck et al. | 250/226 |

*Primary Examiner*—James P. Trammell
*Attorney, Agent, or Firm*—Zarley, McKee, Thomte, Voorhees, & Sease

[57] ABSTRACT

An apparatus and method for determining plant population, plant spacing, plant spacing variability, and other information regarding row-planted crops. The apparatus senses the presence of a plant. The sensing can be adjusted to ignore such things as leaves, weeds, or other irrelevant items. The apparatus also concurrently measures the distance between each sensed plant. The information regarding location and distance between plants is used to derive plant population and plant spacing data. The method senses the location and distance between plants for a given area to derive the population and spacing data.

18 Claims, 9 Drawing Sheets

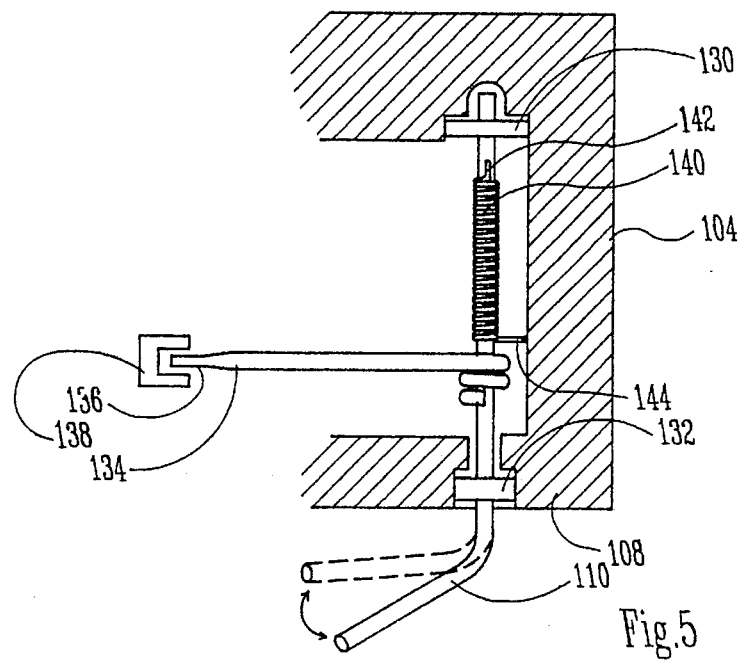
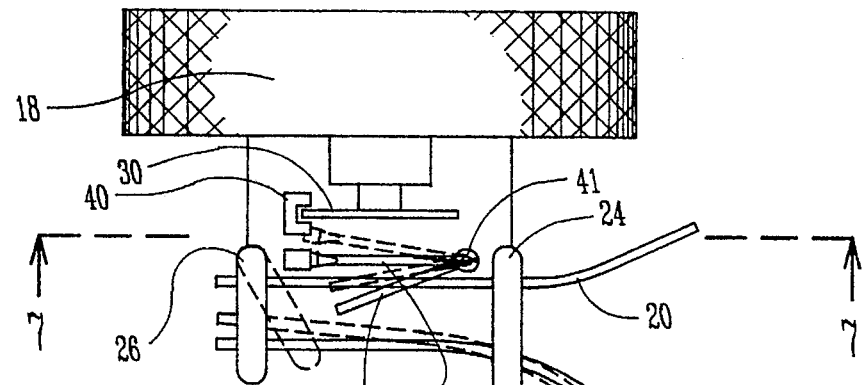
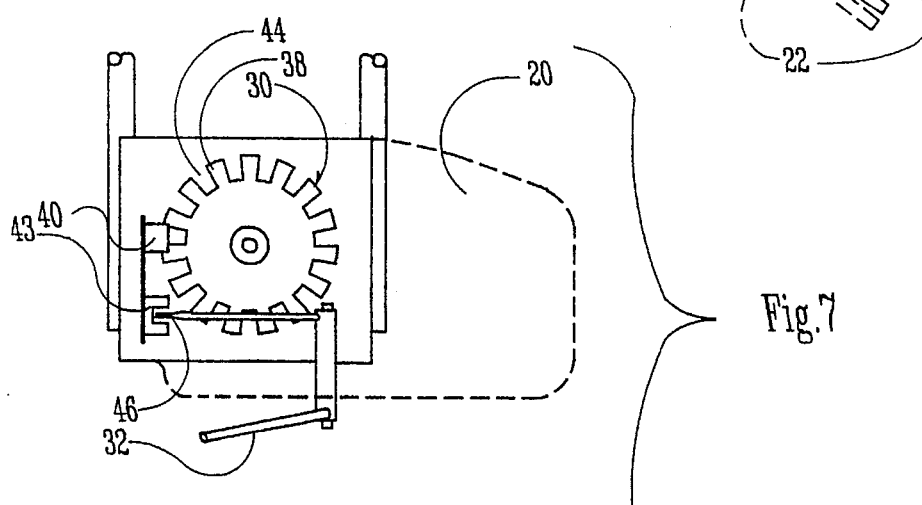

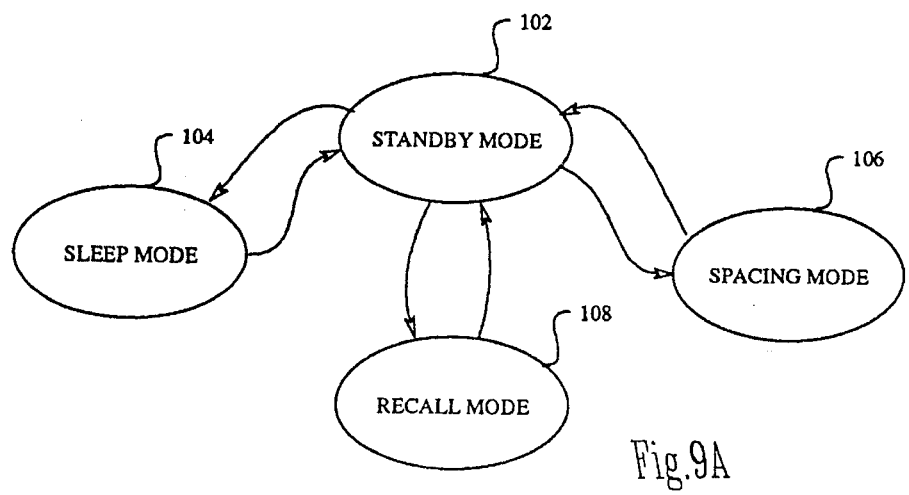
Fig.9A
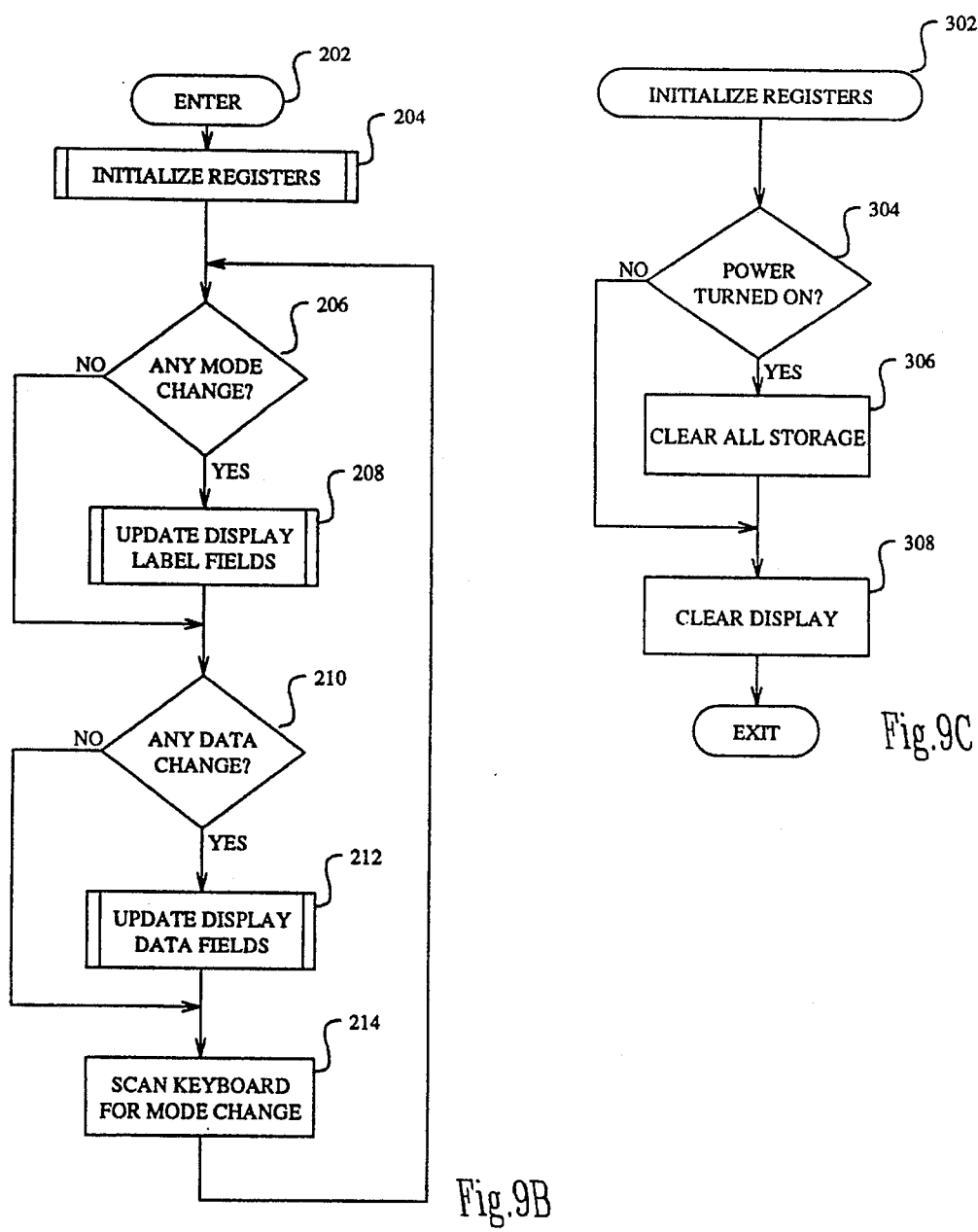
Fig.9B
Fig.9C 5,568,405

DEVICE TO MEASURE AND PROVIDE DATA FOR PLANT POPULATION AND SPACING VARIABILITY

BACKGROUND OF THE INVENTION

A. Field of the Invention

The present invention relates to agriculture, and in particular to determining plant population and spacing for row crops.

B. Problems in the Ark

Maximum yields from row crops can be related to maximizing uniform distribution of the plants. Therefore, it is of interest to find out plant distribution for planted fields.

Row-crop planters generally are able to crudely control plant spacing. After-the-fact plant spacing measurement can provide information regarding faulty or mis-calibrated planters. It can also provide information regarding problems caused by particular soil conditions or pests.

The only widely used post-emergence plant spacing measurement system is manual in nature. A ruler or tape measure (or other measuring standard) is manually placed between succeeding plants in a row. Besides the obvious burdensome nature of this procedure to gain enough information to get an accurate picture of plant spacing and plant population, inaccuracy problems exist. Also, it requires essentially pen and paper calculations to derive estimates of plant population and spacing variability. Still further, it cannot provide immediate information. Additionally, storage and retrieval of the final calculations are difficult.

There is a real need in the art, therefore, for a way to improve over the present method of measuring plant spacing and calculating plant population.

It is therefore a principle object of the present invention to provide an apparatus and method which improves over and resolves the problems and deficiencies in the art.

Other objects of the present invention are:

1. An automated system of plant spacing measurement and plant population determination.
2. An automated way to calculate and record plant spacing, plant population, and plant spacing variability.
3. An almost real-time ability to calculate and record the above data.
4. Improved accuracy in recording the data and making the determinations.
5. An easy to use, economical apparatus and method.
6. The ability to store and recall the data.

It will be appreciated that additional objects, features, and advantages of the invention will become more apparent with reference to the specification and claims.

SUMMARY OF THE INVENTION

The present invention includes an automated apparatus and method for making determinations of plant population and spacing for row crops. Plants along the row are sensed and an electrical signal is generated for each sensed plant. Concurrently the distance between plants is sensed and recorded. The accumulated data over a given distance allows calculation of plant population, spacing, and spacing variability for a given area of the field.

The invention features, in one embodiment, improved accuracy and plant sensing. An adjustable mechanical arm senses a plant as the apparatus of the invention passes by the plant. The arm activates a device which then produces an electrical signal indicating the sensed plant.

Another feature of the invention according to an embodiment of the invention involves more accurate determination of distance between plants. A ground-contacting tire rotates. A device produces an electrical signal correlated to precise distance along the ground traveled by the tire. The signal correlated to distance can then be correlated to the signal of the sensed plants.

According to another feature of an embodiment of the invention, more accurate calculations of plant population and spacing are derived. The accurate information regarding plant spacing is utilized to calculate the standard deviation of spacing between plants which then more accurately portrays plant population for a given area of the field.

By utilizing a processor, the information can be generated in close to real time.

BRIEF DESCRIPTION OF THE DRAWINGS

FIG. 5 is an isolated sectional view taken along line 5—5 of FIG. 6.

FIG. 6 is a partial sectional view, partial top plan view taken along line 6—6 of FIG. 3.

FIG. 7 is a partially exposed elevational view taken along line 7—7 of FIG. 6.

FIG. 9A–9G are a flow chart of software programming according to a preferred embodiment of the present invention.

Figure 1:
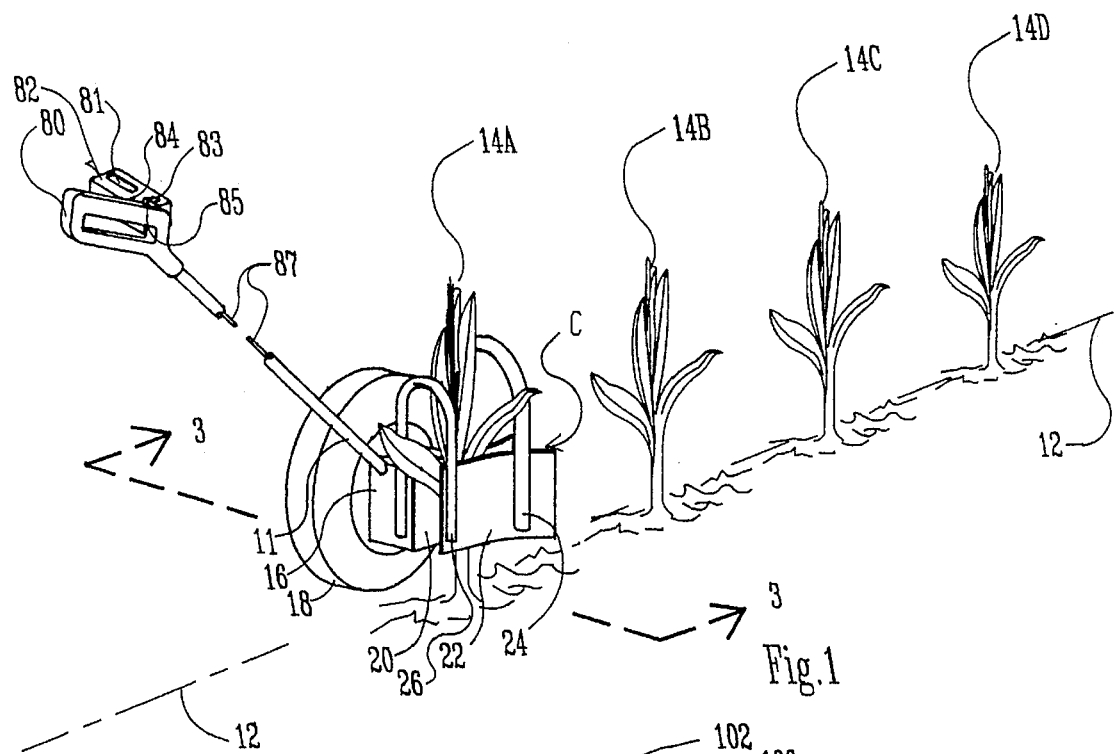
FIG. 1 is a perspective view of one embodiment of the invention in use along a crop row preferably for smaller plants.

An addendum to this specification sets forth a preferred embodiment of software programming according to the present invention.

DETAILED DESCRIPTION OF THE PREFERRED EMBODIMENT

A. Overview

The following description will set forth in detail a preferred embodiment of the present invention. Frequent reference will be taken to the appended drawings, which form a part of this description. Reference numerals will be used to indicate certain parts and locations in the drawings. The same reference numerals will indicate the same parts and locations in the drawings unless otherwise indicated.

B. Hardware

FIG. 1 depicts, in isolated perspective format, a plant spacing measurement device 10 according to the present invention. Device 10 is particularly adapted for use with small or smaller sized plants, such as young corn, as one example. A crop-row (indicated generally by the line 12)

includes a plurality of plants 14 (indicated by succeeding reference numerals 14A, 14B, 14C, etc.).

It is understood that device 10 is generally passed through a field once the plants are of a sufficient size that they are distinguishable mechanically from grasses and small weeds. For example, approximately one month of growth for many row-crop plants is sufficient.

FIG. 1 illustrates the major components of device 10. A base or frame 16 serves as the main supporting component of device 10 and contains certain electrical components which will be described in more detail later. It also contains certain mechanical components which will also be described later.

A member 11 extends from base 16 and can either comprise a handle for manual gripping and control of the movement of device 10 through the field, or can comprise a mounting bracket for attachment of device 10 to another piece of equipment or a vehicle, such as a tractor or field implement like a cultivator.

A ground-contacting tire 18 is rotatably connected to frame 16. In the preferred embodiment, the height of frame 16 could be adjustable to accommodate the use of the invention on different size plants. For example, when sensing small plants, the arm 32 would need to be close to the ground. When sensing larger plants, the arm 32 could be farther from the ground.

What will be called shields 20 and 22 are connected to frame 16. Shield 20 is directly connected to frame 16; shield 22 is connected to frame 16 by U-shaped brackets 24 and 26. As can be seen in FIG. 1, U-shaped brackets 24 and 26 extend upwardly from base 16 in an inverted fashion and then back down to suspend shield 22 in a spaced apart position from shield 20 to allow plants 14 to pass between the shields 20 and 22.

Shields 20 and 22 can be solid and made of such materials as plastics, metal, or similar fairly rigid materials, or can be non-solid, such as mesh, screen, or even a more open framework. Shields 20 and 22 pass above the surface of the ground when in Use.

It should also be noted in FIG. 1 that the space between shields 20 and 22 defines what will be referred to as a plant channel "C". The forward or receiving portion of the plant channel C is defined by corresponding front ends of shields 20 and 22, and as shown in the Figures, those front ends are usually wider apart than the distance between shields 20 and 22 at the exiting or rear ends of shields 20,22. Shields 20 and 22 therefore basically allow for some variance of alignment of plants 14 along row line 12 so that plants are not missed or so that they are gently directed into channel C to avoid damage and also in a fashion that they are funneled towards the constricted exiting end of shields 20 and 22 which facilitates more accurate plant sensing.

FIG. 1 also shows that at an opposite end of member 11 is a handle grip 80 which is used to control movement of device 10 along the crop row. A control box 82 is mounted on the end of member 11 and/or handle grip 80. Control box 82 houses most of the electronics with respect to device 10 and the battery power source for device 10. Wires 87 communicate electrically between base 16 and control box 82.

Control box 82 has a display 81 (for example, an LCD), a control switch 83 and a recharging light 84. Another control switch 85 exists on handle grip 80. These components are standard, off-the-shelf products.

It is to be understood that the parts described above regarding device 10 can be made from a variety of different materials. They can also be configured of various shapes and sizes. Those matters can be selected according to design choice.

Figure 2:
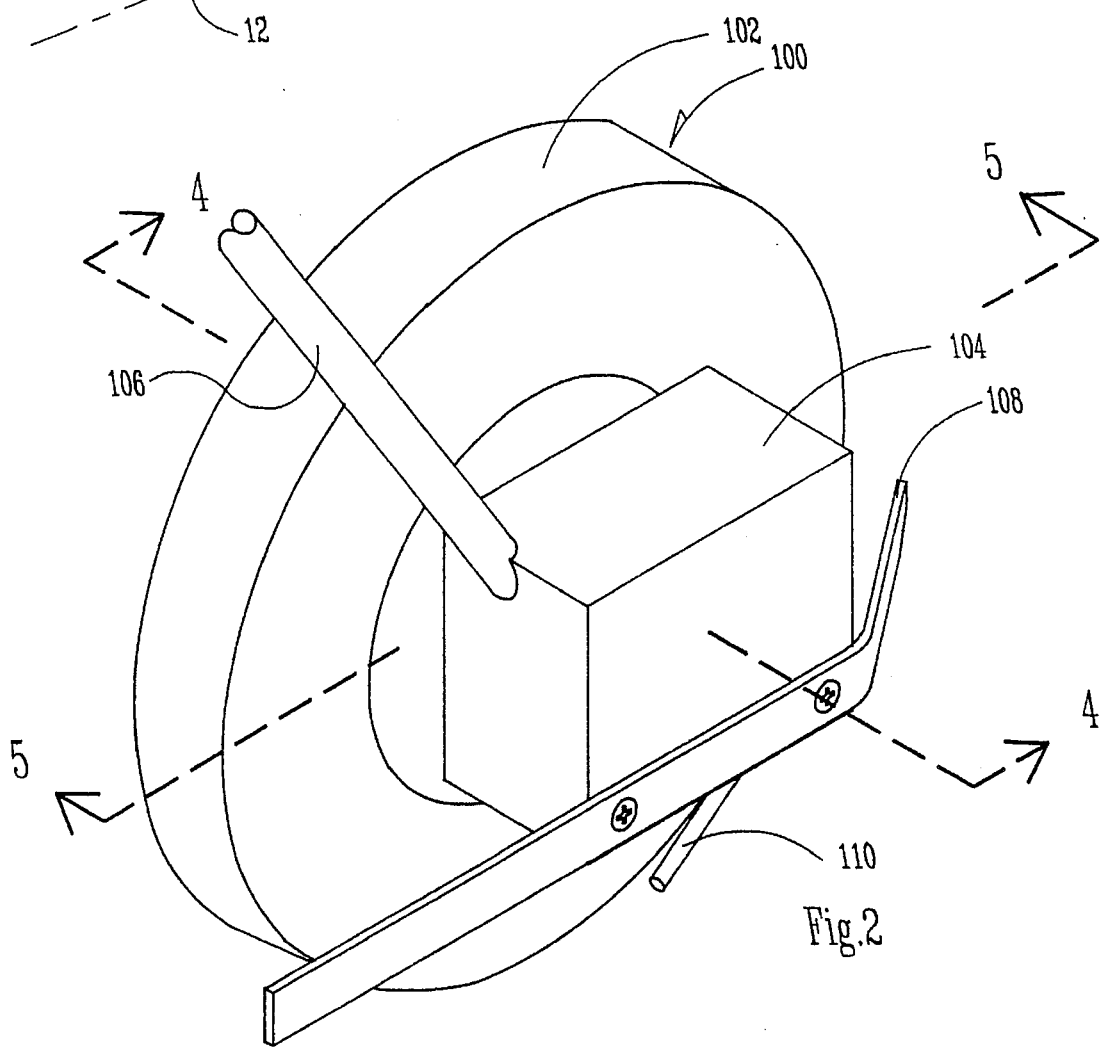
FIG. 2 is a partial perspective view of an alternative embodiment of the invention preferably for larger plants.

FIG. 2 shows in perspective an alternative embodiment 100 according to the present invention. Device 100 is preferably for larger sized row crop plants. A larger wheel 102 is rotatably connected to a base 104. Handle 106 extends away from base 104. It is to be understood that handle 106 can be connected to a hand grip and control box like described with regard to device 10, or otherwise could be connected to some other structure such as, for example, a tractor or implement.

Device 100 differs from device 10 principally in that a narrow rail 108 having an outwardly bent front end is connected to base 104. Arm 110 extends outwardly below rail 108 and is pivotable towards rail 108.

Whereas device 10 has shields 20 and 22 through which plants 14 are guided and detected, on larger plants it is not reasonable to have an outside shield analogous to shield 22 because it would require a structure to extend upwardly, over, across the crop row and then back down to such a shield. This would be unwieldy and unbalancing. Furthermore, with larger plants, it has been found that the operator can adequately steer tire 102 such that the plants slide along rail 108 and then trip or depress arm 110 to allow plant sensing.

Figure 3:
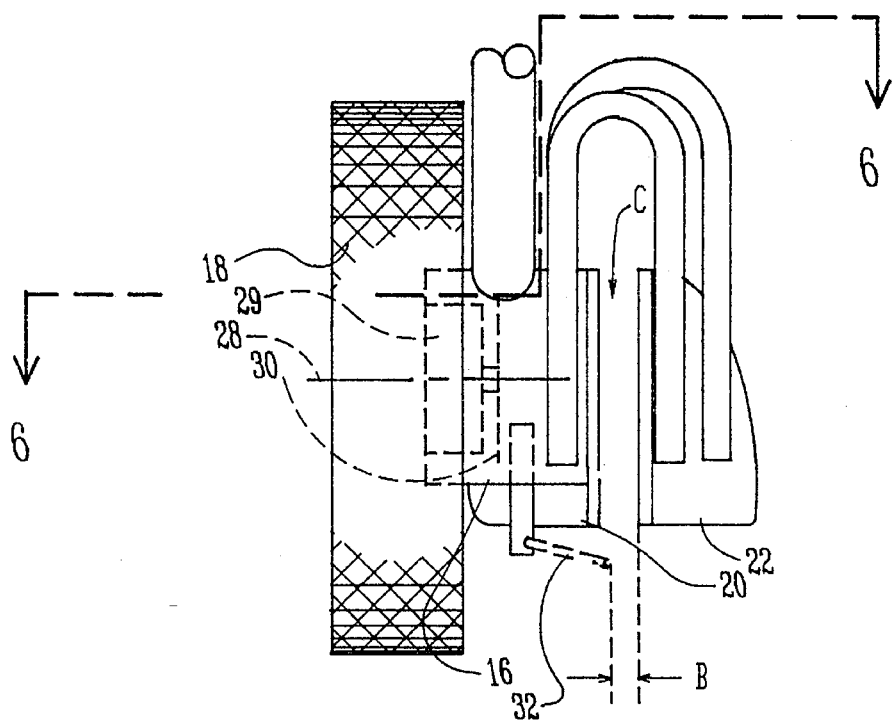
FIG. 3 is a back end elevational view taken along line 3—3 of FIG. 1.

FIGS. 2–7 show in more detail the precise arrangement and relationship of certain parts of devices 10 and 100. As shown in FIG. 3, tire 18 of device 10 is rotatably mounted to frame 16 along a rotational axis 28. The precise manner of rotational attachment to frame 16 is within the skill of those skilled in the art. For example, an axle can be used, or frame 16 itself could serve as the rotational support or hub. In the preferred embodiment, tire 18 is fixedly attached to a hub 29 that is rotatably journaled in base 16. In the preferred embodiment, a toothed wheel 30 is concentrically and rotatably mounted to hub 29 inside frame 16. Essentially wheel 30 rotates with tire 18.

FIG. 3 shows in more detail how shields 20 and 22 are flared outwardly to receive and funnel plant 14 through plant channel C. FIG. 3 also shows that an arm 32, pivotably attached to frame 16, includes an outer free end. A plant 14 passing through the plant channel C between shields 20 and 22, if of sufficient thickness (greater than the distance designated as B), will strike arm 32 and cause arm 32 to pivot away from plant channel C. Once plant 14 has passed arm 32, arm 32 (which is spring loaded or otherwise biased), returns to its normal or original position awaiting the next plant.

Figure 4:
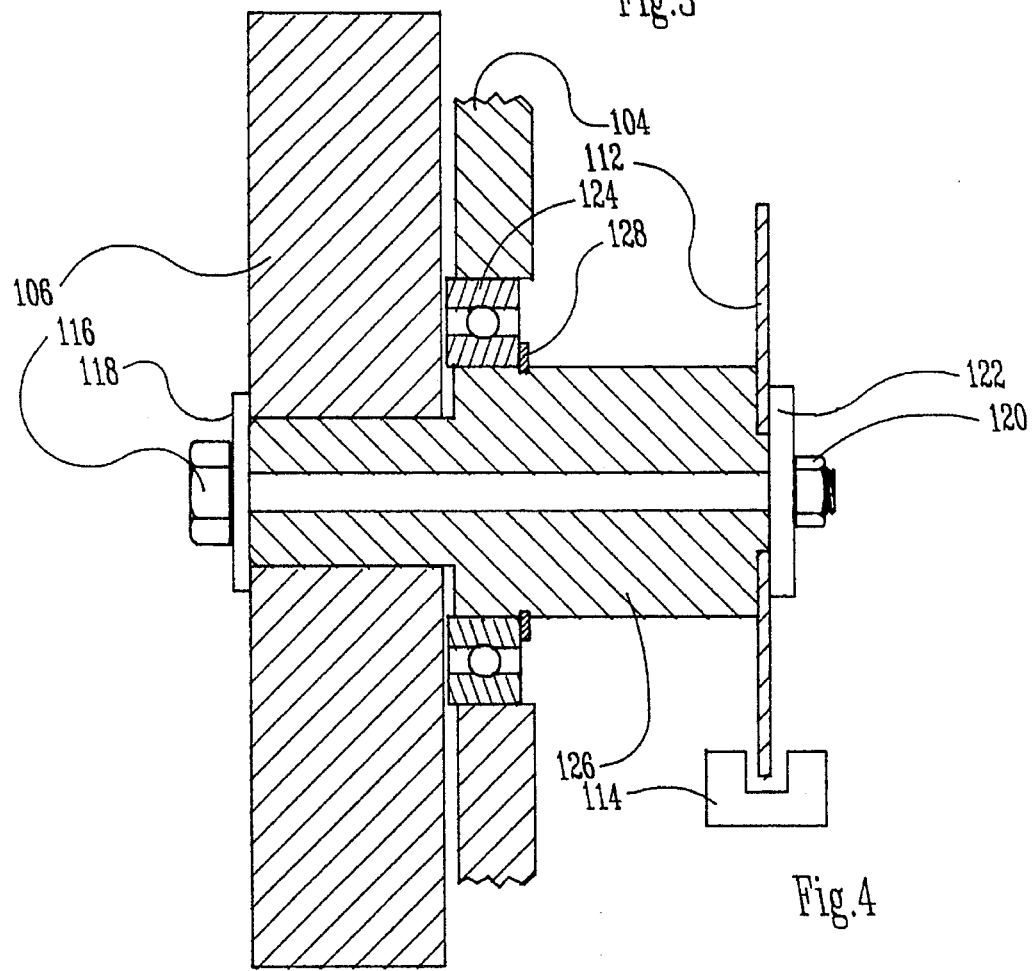
FIG. 4 is a sectional view taken along line 4—4 of FIG. 2.

A more specific example of the attachment of a wheel to the base is set forth in FIG. 4. FIG. 4 shows in cross-section the relationship between tire 106 and toothed wheel 112 for device 100. An axle 126 of various cross-sectional diameters, extends through the center of wheel 106 (and is connected to wheel 106 by bolt 116 and washer 118). The other end of axle 126 is connected to tooth wheel 112 by bolt 120 and washer 122. A bearing 124 surrounds the portion of axle 126 between tire 106 and toothed wheel 112 and is held in place by a spline 128. This allows smooth and reliable rotation of wheel 106 relative to base 104.

In both embodiments 10 and 100, two signals are derived from the portion of the devices that are near the ground. These signals are used to calculate the data regarding plant distribution. First, the distance traveled is calculated. By referring to FIG. 4, it is to be understood that a toothed wheel 112 rotates between the sides of an optointerrupter 114.

Predesign of the diameter of wheel 112 and the spacing between teeth around the perimeter of wheel 112 allows optointerrupter 114 to provide a signal to control box 82 (FIG. 1) from which distance traveled can be derived.

FIG. 5 illustrates one way sensing of the plant can be accomplished. Arm 110, consisting of a relatively thick and rigid wire, is bent so that it has a portion that extends at an oblique angle from rail 108 (See FIG. 2). The portion of arm 110 within base 104 has bearings 130 and 132 which allow it to rotate in housing 104. A secondary arm 134, in a preferred embodiment made of wire, is wrapped around arm 110 and fastened in place. Its outer flattened end 136 normally is positioned between the sides of optointerrupter 138.

A torsion spring 140, inserted along arm 110 and having first end 142 placed along arm 110, and a second end 144 which abuts against a portion of the interior of the base 104, holds flat end 136 in its normal position in between sides of optointerrupter 138, and holds the outer free end of arm 110 in a spaced apart oblique position from rail 108. End 142 of spring 140 is basically fixed relative to arm 110. Movement of arm 140 by a plant causes spring 140 to deflect so that when the plant is passed, spring 142 seeks its original, undeflected state, thus turning arm 110 back to its normal position. When a plant hits arm 110 it pivots it towards rail 108, secondary arm 134 pivots out of optointerrupter 138 (e.g., dashed lines of arm 42 in FIG. 6). In the preferred embodiment, the torsion spring 140 is configured so that it snaps the free end of arm 110 immediately back to the normal position (shown in solid lines) once the plant is passed. At this point the flattened portion 136 of secondary arm 134 re-blocks optointerruptor 138. The reblocking of optointerrupter 138 is the point in time of determining a sensed plant.

It is to be understood that by selection or adjustment of the torsional characteristics of spring 140, the sensing sensitivity of arm 110 can be adjusted. A stiffer spring 140 would be used for larger row crop plants and therefore would reduce the likelihood that smaller plants such as grasses or weeds would trip arm 110.

It is also to be understood that a wide variety of different arrangements as to the structure of a triggering mechanism and how it would actuate a signal indicating the sensing of the plant is possible. Different distance measuring apparatus and methods are also possible.

FIGS. 6 and 7 illustrate how plants are sensed and an electrical signal for responding to the sensing of the plants is generated with regard to device 10, and also how distance between plants is measured and a signal corresponding to that distance is generated with regard to device 10.

FIG. 7 shows an inside elevation of a toothed wheel 30. Each tooth 38 is uniformly sized and spaced relative to a succeeding tooth 38. An optointerruptor 40, consisting of a photo emitter and a photo detector, is positioned so that the path of rotation of teeth 38 passes between the photo emitting and photo detecting portions of optointerrupter 40 (see FIG. 6).

With respect to arm 32, it can be seen in FIG. 6 that it pivots about pivot 41. A secondary arm 42 pivots with arm 32. Secondary arm 42 includes a portion 46 (see FIG. 7) that extends between the photo emitting and photo detecting portions of a second optointerruptor 43. When arm 32 pivots out of plant channel C, portion 46 passes from its original or normal position between portions of optointerruptor 42, to a position that opens the light pathway between those portions. A spring or other biasing means can be associated with pivot 41 or arm 32 to return arm 32 to normal position once force against arm 32 is released.

Another feature is shown in FIG. 6 is the ability of shield 22 to be pivoted from the position shown in solid lines, to a position shown in dashed lines. This allows the width of the restricted exit end of plant channel C to be adjusted for different sized plants. This is important for the following reason. If the plants being measured have an average thickness of, for example, ½" across their stem, by making plant channel C approximately ½" thick, it will insure that arm 32 is moved when such a stem, or a stem of substantially similar size passes. However, if weeds or grasses pass through (with thicknesses substantially less than ½'), they can pass by arm 32 without tripping it.

Shields 22 could be attached to bracket 24 by means well known by one of ordinary skill in the art. Alternatively, shield 22 could be fixed to bracket 24, but a separate pivotable piece, such as a wire or a panel could be pivotably attached to shield 22, bracket 24, or bracket 26, and have a rearward end that could be moved relative to the free end of arm 32 to provide a larger or smaller gap for plants to pass through.

C. Electrical Components

Figure 8:
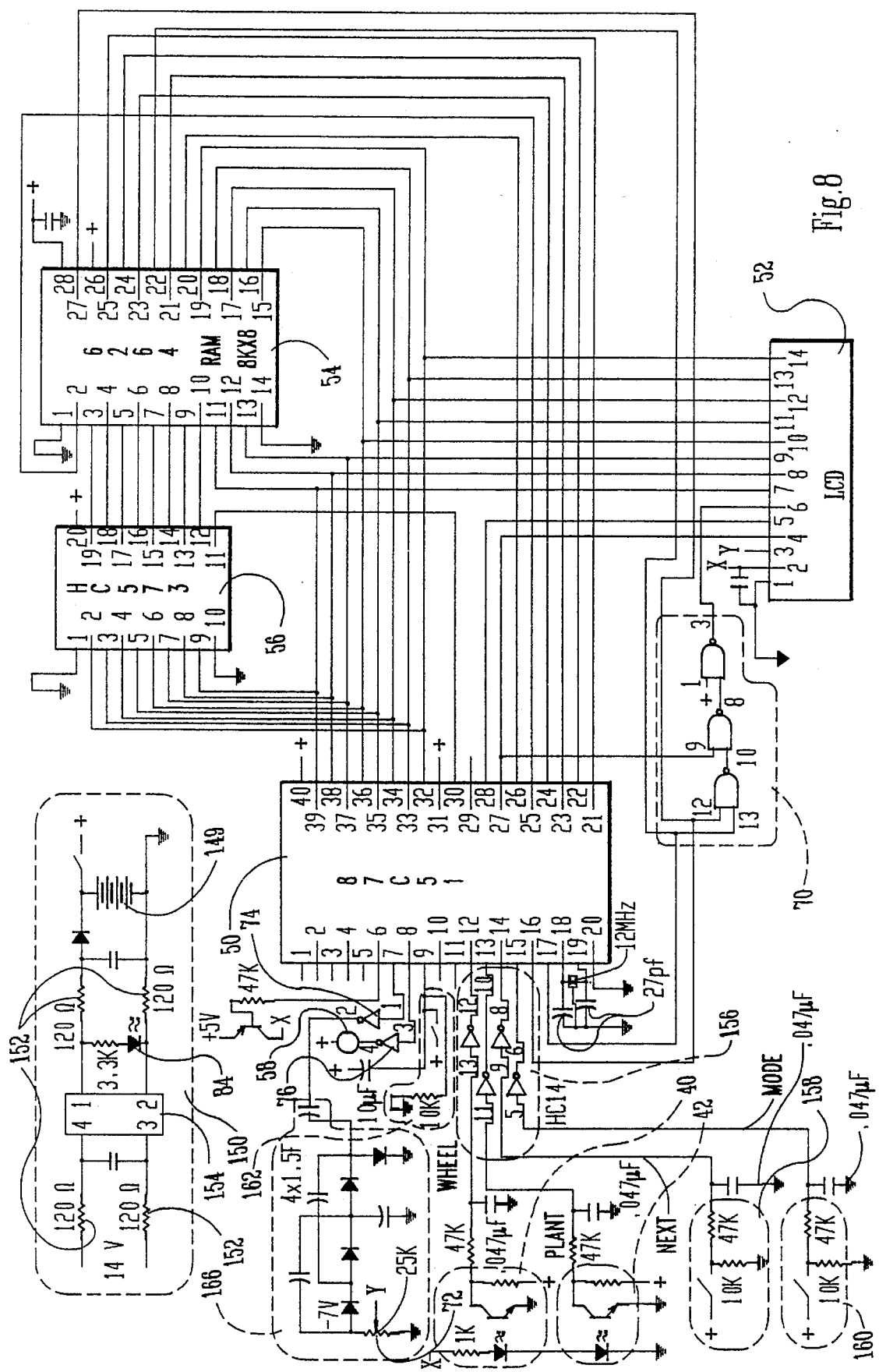
FIG. 8 is an electrical schematic of circuitry according to a preferred embodiment.

FIG. 8 is an electrical schematic of a preferred embodiment of the electrical circuitry according to the invention.

FIG. 8 shows that in the preferred embodiment a five volt power source is utilized. In the preferred embodiment electrical power for the circuitry is provided by four Ni-Cad batteries 149 which can be recharged from any AC or DC source from 8 to 24 volts. Reference numeral 150 in FIG. 8 shows a recharger circuit used in the preferred embodiment. A port or electrical connection can be placed on device 10 or 100 to receive standard electrical household current into recharger 150, which then converts it to a form that is useful in recharging the Ni-Cad batteries. The four Ni-Cad batteries provide numerous hours of operation per charge. Recharging could be from a 12 volt automotive system or by other means such as are well known. Four 120 ohm resistors 152 are used for charge current limiting, and will allow charge voltage to be considerably higher than 12–14 volts, if necessary. A bridge rectifier 154 is used so that charge polarity is unimportant. An LED 84 (see also FIG. 1) indicates when charger voltage is present. A processor 50 receives input signals from optointerruptors 40 and 42 at pins 12 and 13 respectively (see "Wheel" and "Plant"). Processor 50, utilizing the five volt power source, operates a display 52. A memory 54 and latch 56 allow storage of data collected by device 10 for selective display.

Since the address and data buses used with the circuitry are common, 74HC573 octal transparent latch 56 is needed to store RAM 54 address information during RAM read/write operations.

Processor 50 is an 87C51FB microprocessor. Its main advantage is its low power requirement. Its functions are to, perform calculations based on the signals generated by the two optointerruptors 40 and 42, store and retrieve RAM 54 data, and drive display 52. Microprocessor 50 runs at 12 MHz.

Display 52 is a 16 character×2 line transflective dot matrix LCD as from Optrex. It has its own element drivers, character generators, and RAM, so the microprocessor 50 only tells LCD 52 what to display and where.

The 74HC00 quad NAND gate (see three NAND gates encircled by dashed line 70 between elements 50 and 52 in FIG. 8) provides an interface between microprocessor 50 and display 52. A 25K potentiometer 72 from the negative voltage circuit to ground provides adjustable display contrast for varying light and reading angles.

Optointerruptors 40 and 42 are matched pairs of infrared emitters and detectors, with a small air gap between to allow passage of a moveable interrupting device (in the preferred embodiment, portion 44 (or 136) or wheel 30 (or 112)). As beam intensity decreases, the infrared detector (a photo transistor) turns off, increasing the collector voltage (sensing when arm 32 (or 110) returns to normal position), The dark output voltage is very nearly 5 volts, and with no light interruption, nearly 0.

The 47K resistors and 0.047 micro-fared capacitors on four inputs of a 74HC14 Schmitt trigger inverter 156 form low pass filters to reduce noise susceptibility. Since the motion of wheel 30 (or 112) and portion 44 (or 136) is relatively slow, the photo transistor outputs of optointerrupters 40 and 42 also change rather slowly. Schmitt trigger 156 provides squared output even with a slowly changing input, and its built-in hysteresis reduces false triggering. Stated another way, as an optointerrupter is occluded, or occlusion is removed, its electrical output increases or decreases somewhat linearly in the form of a voltage. The Schmitt trigger provides a sharp precise cut-off in either instance thus eliminating any false plant sensing caused by noise.

Information can be displayed on display 52 (in the preferred embodiment a dot matrix LCD) which is driven by processor 50. In the preferred embodiment, an audio annunciator 58 (in this case a horn) can provide an audible signal each time a plant 14 is sensed and/or when a control switch, described below, is actuated.

A few control switches are used to invoke the various operating modes. Control switches can be used to select between various display modes for devices 10 or 100. Signals from the control switches are debounced and squared by the Schmitt trigger 74HC14 (reference numeral 156).

Control switch 83 (see also FIG. 1) and control switch 85 (see also FIG. 1) can control functions such as the following. The "next" switch (reference numeral 158 in FIG. 8), serially cycles through a number of measurements and displays them on display 52. The "mode" switch (reference 160 in FIG. 8) allows selection between modes such as recall or not recall.

Reference numeral 162 in FIG. 8 shows an on/off switch for the device. It is to be noted that processor 50 can be programmed so that the on/off switch merely controls whether display 52 is on or not so that all stored measurements are saved for later use, which takes very low power, as compared to operating the display continuously.

The timer or counter in microprocessor 50 which performs the distance interpolation function also generates a 4 kHz square wave signal which is fed to inverter 74. The output of inverter 74 drives a voltage converter circuit 166 which provides a negative voltage for an LCD contrast adjustment. Inverter 76 provides current drive for the audio annunciator.

All electronic parts are generally available, commodity type components. As many surface mount parts (resistors, capacitors, IC's) as possible were used for compactness. The IC's are all CMOS because of their availability and low power consumption. Materials such as for the housings can be from a wide variety of choices. Examples are wood for ease of fabrication and convenience, however, such things as rigid plastic or metal would be preferable because of stiffness and strength. Member 11 extending between the wheel portion and the handle portion is preferably aluminum or steel tubing.

D. Software

The addendum to this specification contains an actual software program according to the preferred embodiment of the present invention. Such programming is loaded into processor 50 by means well known to those skilled in the art. FIG. 9 summarizes, in flow chart form, the program of the addendum.

FIG. 9A indicates the basic overall structure of the software, comprising standby mode 102, sleep mode 104, spacing mode 106, and recall mode 108. Standby mode simply places the processor in a waiting condition until it is instructed to begin measurements (spacing mode 106). Sleep mode allows conservation of battery resources without losing information stored in memory. Recall mode allows different measurements to be recalled and viewed.

FIG. 9B illustrates one sub-routine of the software (see reference numerals 202–214). Further sub-routines which initialize registers 204, update display label fields 208, update display data fields 212 are shown in flow chart form at FIGS. 9C (see reference numerals 302–308), 9D (see reference numerals 402–422), and 9E (see reference numerals 502–514) respectively.

Figure 9D:
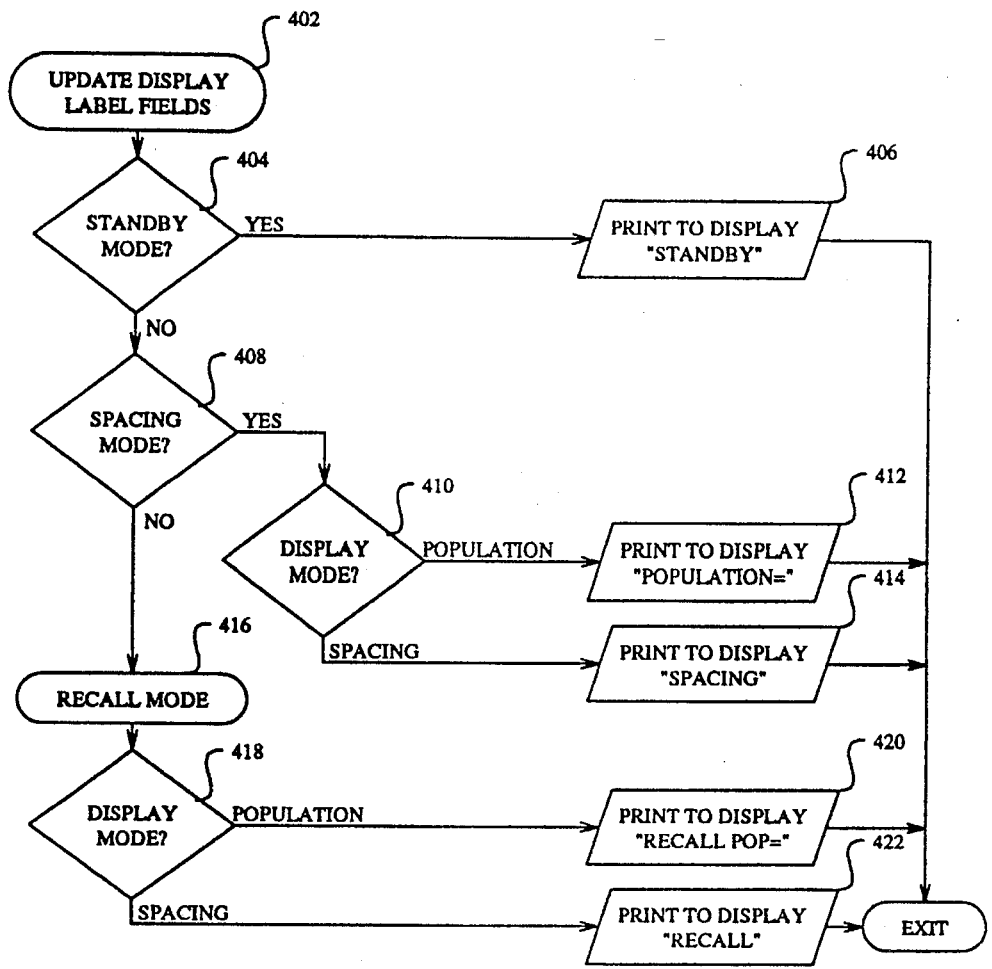
Figure 9E:
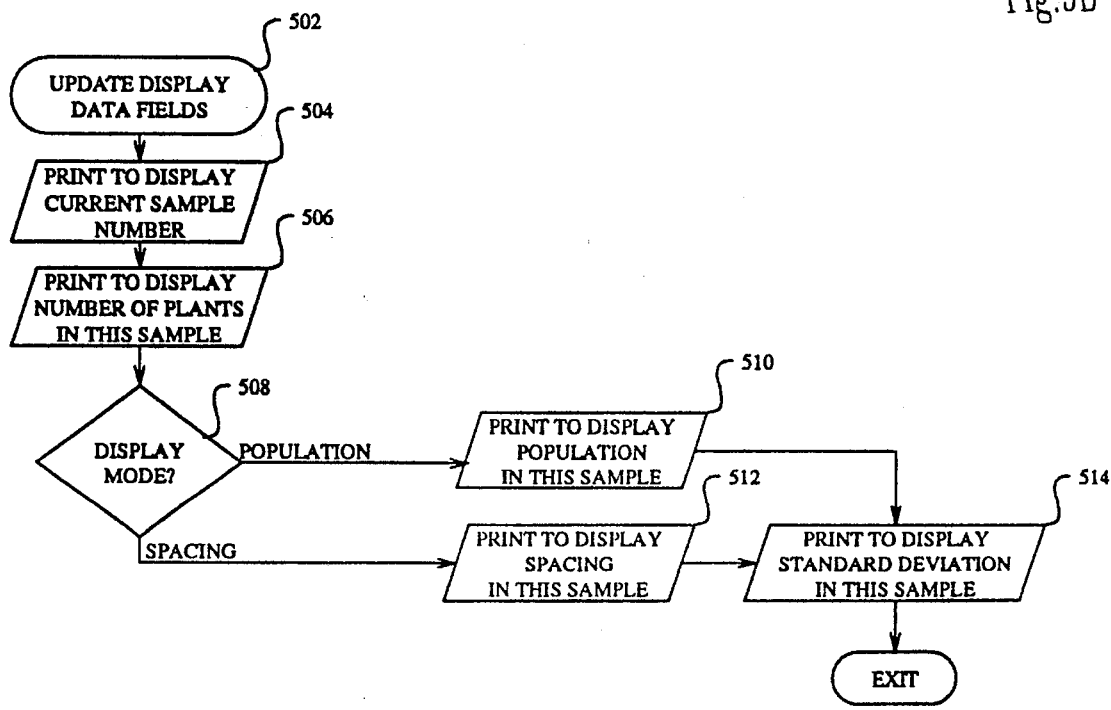
Figure 9F:
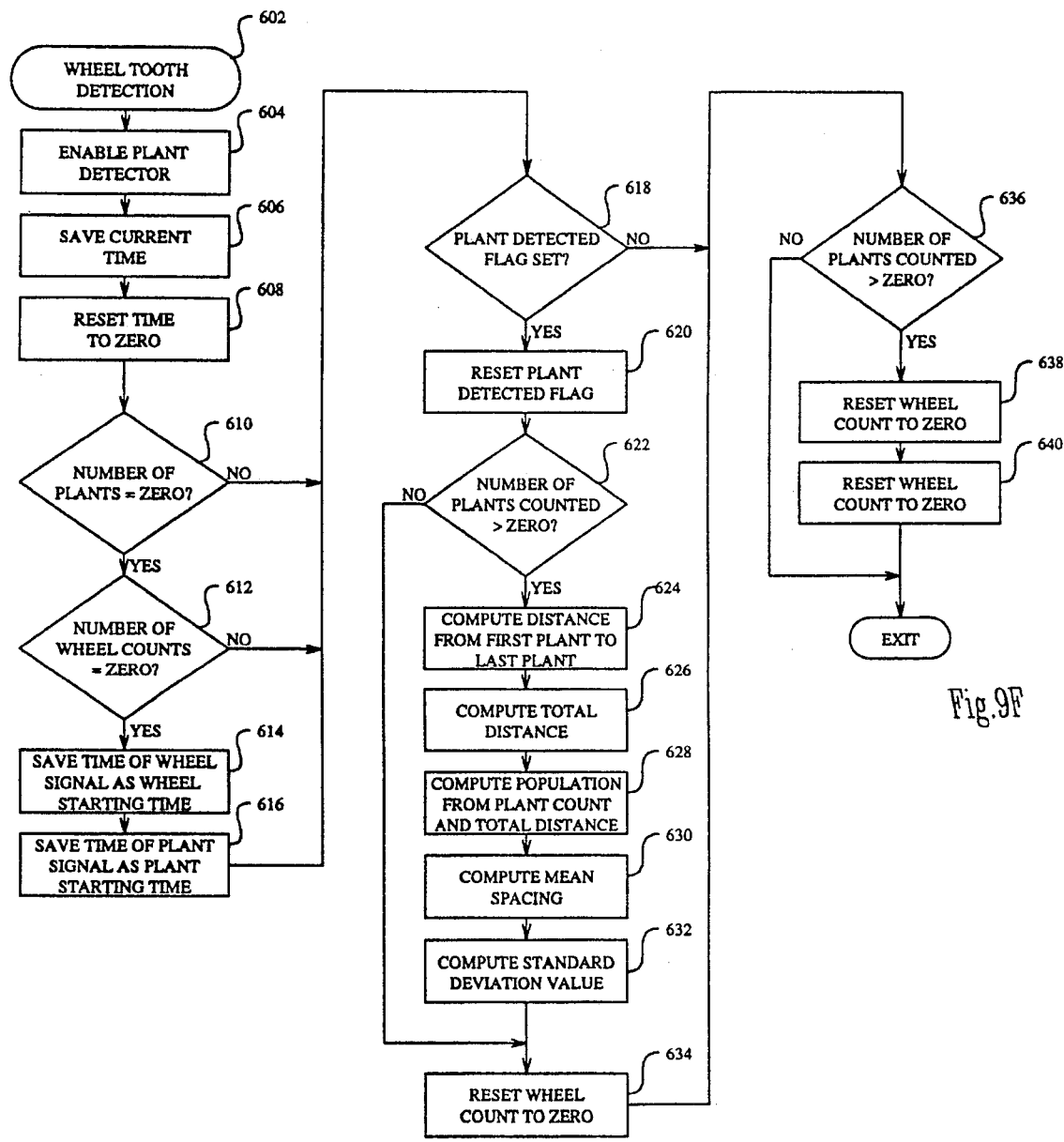
Figure 9G:
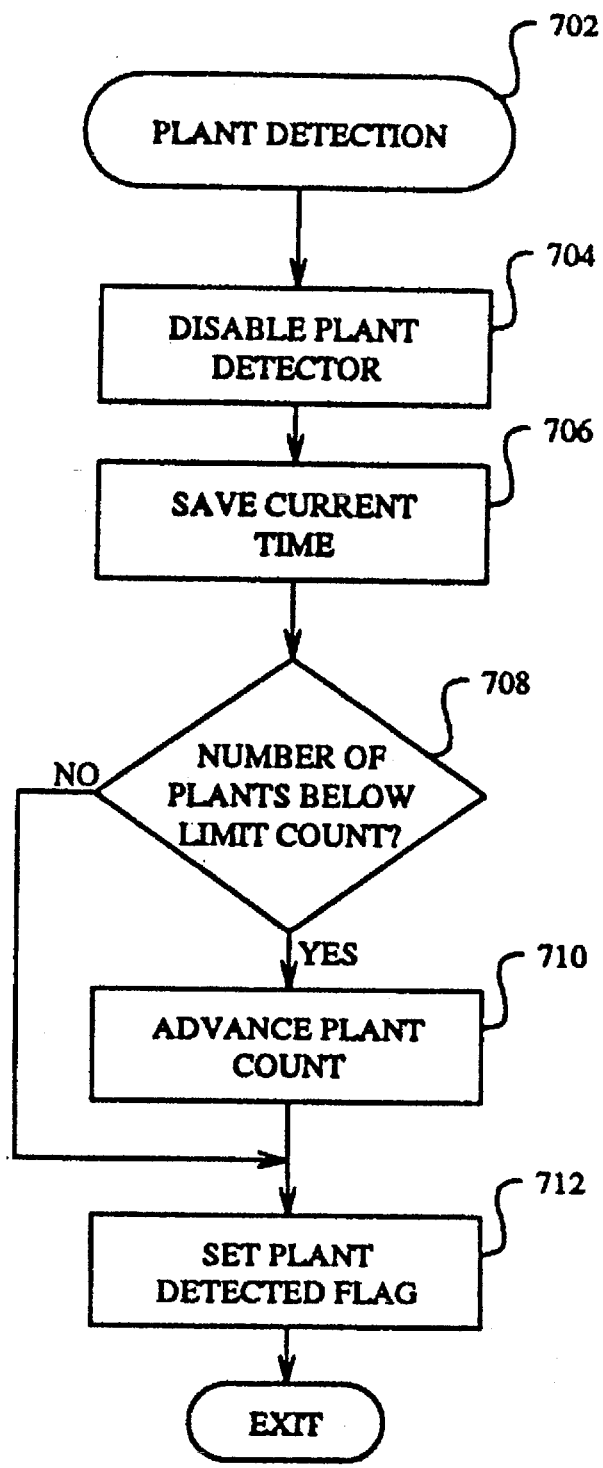

FIGS. 9F (see reference numerals 602–640) and 9G (see reference numerals 702–712) show the sub-routines for spacing mode 106, namely how wheel tooth detection occurs and how plant detection occurs; and how they then both function to provide information relevant to the measurements that can be accomplished by the invention.

It is to be understood that the embodiment of the software programming set forth in the appendix is based upon flow chart of FIGS. 9A–9G but that other flow charts and other software programming code could be used to accomplish the goals of the invention.

E. Operation

Device 10 measures plant population and spacing variability by sensing the distance between successive plants in a row and performing calculations on the accumulated measurements. When a plant 14 of sufficient girth (wider than distance B in FIG. 3, or strong enough to overcome the torsion spring or outward biasing of the arm 32 or 110) is passed between arm 32 or 110 and shield 22 or 108, arm 32 or 110 pivots so that portion 46 or 136 of secondary arm 44 or 134 temporarily moves out of the light beam path of optointerruptor 42 or 138. A signal (such as an electrical pulse) is then sent to processor 50. It is to be noted that this method was used rather than directly sensing a plant 14 with a light beam because it is less sensitive to contamination, more durable, and easier to adjust for proper plant size and so it will not sense non-relevant things such as grass and weeds.

Arm 32 (or 110) is spring loaded and once plant 14 passes arm 32 (or 110), arm 32 (or 110) returns quickly to its original position and the light path is again interrupted to produce a signal to processor 50 correlated to the sensing of a plant. The torsion spring previously described can be used because it is fairly easy to adjust by adding or subtracting turns of the spring along the arm. Other types of biasing are possible. Ultimately it would be preferable to be able to adjust the tension of the arm from some control exterior of the housing or base. In the preferred embodiment, the "sensing" of the plant occurs once arm 32 (or 110) snaps back into normal (undeflected) position. Then the analog output of optointerruptor 42 (or 138) is squared by the 74HC14 Schmitt trigger 156. The signal therefore is a much better and well defined plant sensing signal.

Concurrently, distance is measured utilizing rotating ground-contacting tire 18 (or 102) which directly drives toothed wheel or vane 30 (or 112). As tire 18 (or 102) rotates teeth 38 of vane 30 (or 112) alternatively interrupt and pass the light beam of optointerruptor 40 (or 114). The circumference of tire 18 (or 102) divided by the number of teeth 38 in toothed wheel 30 (or 112) yields the distance traversed by device 10 (or 100) per tooth 38. In one preferred embodiment a 150 mm diameter tire 18 (or 102) is used along with a thirty tooth toothed wheel or vane 30 (or 112). This results in approximately 15.7 mm of travel per pulse generated by optointerruptor 40 (or 114). As previously described, however, larger tires can be used if desired (for example, for use in fields having larger plants or in fields having more disruptions such as uneven terrain, clods of dirt, crop trash, and larger weeds). The size of the wheel must be known as well as the number of teeth on the toothed wheel.

In the preferred embodiment, improved accuracy and finer distance resolution is achieved by utilizing an interpolation calculation in microprocessor 50 based on the input signals from optointerruptors 40 (or 114) and 42 (or 138). A counter within microprocessor 50 sums the number of timing pulses between successive distance pulses. The distance between two successive plant signals will be equal to a certain number of wheel signals plus two fractions of a wheel pulse. To interpolate these fractions, the processor divides the number of timing pulses from the beginning of the current wheel signal to the last plant signal by the total number of timing pulses over the entire previous wheel signal. This way, without knowing the number of timing pulses in the current wheel signal, the processor can accurately estimate at what portion of the current wheel signal a plant was sensed.

For example, assume a first plant was sensed at the beginning of a first wheel signal and a second plant was sensed during the second wheel signal. Since each wheel signal corresponds to 15.7 mm, without interpolation, we only know that the distance between plants one and two is between 15.7 mm and 31.4 mm. Now assume that the processor counts 20 timing pulses during the first wheel signal and counts 15 timing pulses from the beginning of the second wheel pulse and when the second plant was sensed. The processor divides 15 by 20 to estimate that a plant was sensed ¾ into the second wheel signal. Therefore, the distance between plants one and two would be: 15.7+(¾)(15.7)=27.5 mm. Note that when interpolating the distance between the second and third plant, the processor will go through the same process and will also add (¼)(15.7)mm to account for the remainder of the second wheel signal.

It is possible to use a larger toothed wheel 30 (or 102) with more teeth 38, a gear driven toothed wheel 30 (or 102) or more complex and expensive measuring components. However, the combination of the preferred embodiment provides information which is easily executed by the processor 50, and is compact, durable, and inexpensive.

In the preferred embodiment, device 10 (or 100) can accumulate information for up to 99 plant spaces per sample, and can give a continuous readout of population per acre, standard deviation of plant spacing, and number of plant distances measured. It is sometimes beneficial to know whether all the values of plant spacing are concentrated at the "average" or spread out all over the place, i.e., an indication of how variable the body of the sampled data tends to be. The customary measure of variability is the standard deviation. Standard deviation of plant spacing is an indication of the variability of the plant spacing values making up the sample, but it is likely to be a biased estimator of the variation of plant spacing values within the entire plant population. Each time a sample is terminated, these quantities are stored in RAM memory 54 for later recall. Up to 99 samples can be stored. It is to be understood, however, that different components, numbers of stored plant spaces, and samples are possible.

F. Options, Features, and Alternatives

It will be appreciated that the present invention can take many forms and embodiments. The true essence and spirit of this invention are defined in the appended claims, and it is not intended that the embodiment of the invention presented herein should limit the scope thereof.

G. Addendum—Software Programs

Following is a listing of a computer program that can be used with the preferred embodiment of the invention.

Figure 10:
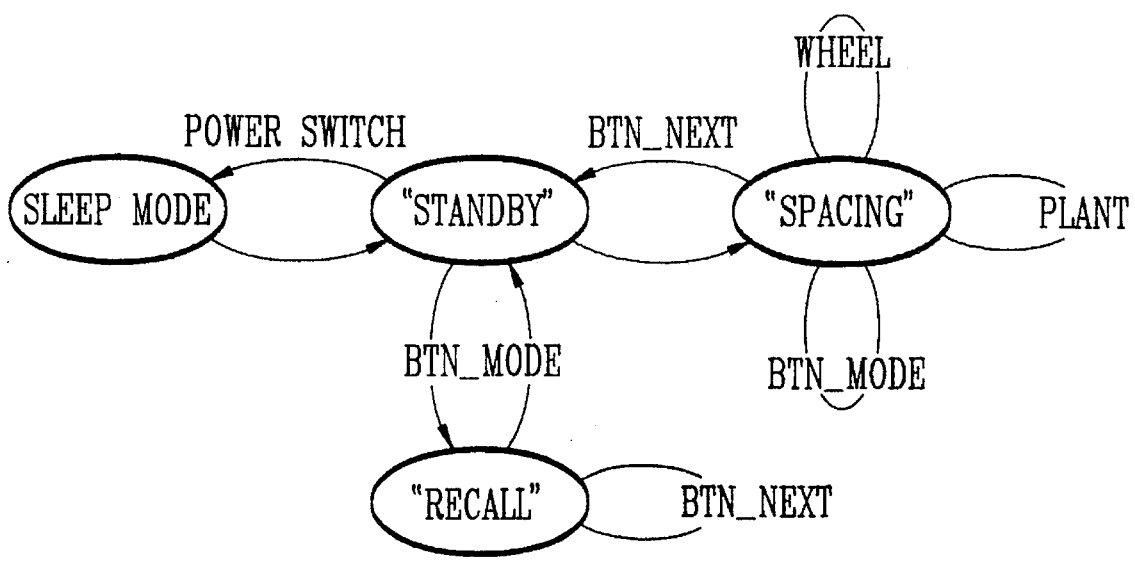
FIG. 10 is a state diagram of the basic operating modes of the invention.

```
/* (use 'Edit Module Settings' to change these items)
          MODULE:  [plants.c]
              BY:  Dave Smart
  LAST SAVED DATE: 26 August, 1994  11:34 AM
   CREATION DATE:  26 August, 1994  11:34 AM
     DESCRIPTION:  Plant spacing/population measuring device
*/ Figure 10
/* following is a state diagram of the basic operating modes

*
*
*
*/

/* system library */
#include <stdio.h>
#include <math.h>
#include <io51fx.h>

/* Hardware definitions */
#define BTN_MODE (!P3.5)
#define BTN_NEXT (!P3.4)
#define BTN_POPULATION P1.0
#define HORN P1.7
#define DISPLAY_POWER P1.5
#define WR_DISPLAY_CMD (*(char *) 0x012000)
#define RD_DISPLAY_CMD (*(char *) 0x01A000)
#define WR_DISPLAY_DATA (*(char *) 0x016000)
#define RD_DISPLAY_DATA (*(char *) 0x01E000)
define DISPLAYBUSY 0x80 define InchesPerTooth 0.625
define RowSpaceInches 30

/* General definitions */
#define TRUE  1
#define FALSE 0
#define FOREVER (1)
#define MAXPLANTSPERSAMPLE 99 /* only allows 2 digits in display */
#define MAXSAMPLES 99   /* how much memory do we have available? up to 99 for 2 digit
                                                                           display */
/* Operating modes */
#define STANDBY 0
#define SPACING 1
#define RECALL 2
char operating_mode;
/* Put operating mode test into external memory space (battery backed) */
#pragma memory=no_init
struct eachsample
```

```
    {
    signed char NumPlants;
    unsigned long Population;
    float xbar;
    float stdev;
    } Sample[MAXSAMPLES];
/* internal ram is kept powered during either idle or powerdown */
unsigned int power_mode, power_modecheck; /* special battery backed memory space */
#pragma memory=default
/* public variables */
#define PLANTHONKTIME 60    /* x .001 Sec */
#define KEYHONKTIME 125
#define KEYDEBOUNCETIME 60
char plant_beep_time;       /* turn on horn while non-zero */
char key_beep_time;
char key_debounce_time;
char plantdetected;
char S_Num;         /* Sample number currently in the display */
int NumWheels, TotalWheels;
unsigned int Timer, TWheel, TPlant, TFirstWheel, TFirstPlant;
float distance, Sx, Sx2;
unsigned long Pop_Constant;
bit update_display;
char buffer[10];   /* display imaging buffer */ define WheelTooth EX0_int
define PlantEdge EX1_int
/*
        #FUNCTION:  WaitForDisplay
*/
void WaitForDisplay(void)
    {
    while (RD_DISPLAY_CMD & DISPLAYBUSY)
        ;
    }
/*
        #FUNCTION:  Beeper
*/
void Beeper(void)
    {
    if (plant_beep_time || key_beep_time)
        {
        HORN = TRUE;
        if (plant_beep_time) plant_beep_time--;
        if (key_beep_time) key_beep_time--;
        }
    else
        HORN = FALSE;
    }

/*
        #FUNCTION:  WheelTooth
*/
interrupt void WheelTooth(void)
    {
    TWheel = Timer;
    Timer = 0;
    EX1 = 1; /* enable the Plant interrupt */
    if (Sample[S_Num].NumPlants == 0 && TotalWheels == 0)
        {
        TFirstWheel = TWheel;
        TFirstPlant = TPlant;
        }
    if (plantdetected)
```

```
        {
        plantdetected = FALSE;
        if (Sample[S_Num].NumPlants > 0)
            {
            distance = (float)InchesPerTooth *
                ((float)NumWheels - (float)TFirstPlant/TFirstWheel + (float)TPlant/TWheel);
            Sx = (float)InchesPerTooth *
                ((float)TotalWheels - (float)TFirstPlant/TFirstWheel + (float)TPlant/TWheel);
            Sx2 = Sx2 + distance * distance;
            Sample[S_Num].Population = Pop_Constant * Sample[S_Num].NumPlants/TotalWheels;
            if (Sample[S_Num].Population > 99999) Sample[S_Num].Population = 99999;
            Sample[S_Num].xbar = Sx / Sample[S_Num].NumPlants;
            if (Sample[S_Num].NumPlants > 1)
```

$$stdev = \sqrt{\frac{Sx^2}{(NumPlants-1)} - \frac{(Sx)^2}{NumPlants*(NumPlants-1)}}$$

```
            /*                                                              */
            Sample[S_Num].stdev = (float)sqrt(Sx2/(Sample[S_Num].NumPlants-1)
                - Sx * Sx / (Sample[S_Num].NumPlants * (Sample[S_Num].NumPlants-1)));
            }
        update_display = TRUE;
        NumWheels = 0;
        }
    if (Sample[S_Num].NumPlants >= 0)
        {
        NumWheels++;
        TotalWheels++;
        }
    }

/*
    #FUNCTION: PlantEdge
*/
interrupt void PlantEdge(void)
    {
    EX1 = 0; /* disable the Plant interrupt at least until after another wheel */
    TPlant = Timer;
    if (Sample[S_Num].NumPlants < MAXPLANTSPERSAMPLE) Sample[S_Num].NumPlants++;
    plantdetected = TRUE;
    if (plant_beep_time == 0) plant_beep_time = PLANTHONKTIME;
    }

/*
    #FUNCTION: T1_int
    #DESCRIPTION: interrupt occurs every 128 uSec.  Advances Timer every 1.024 mSec.
*/
interrupt void T1_int(void)
    {
    static char prescaler;
    P1.6 = ~P1.6; /* Toggle the charge pump, net frequence = 4 khz */
    if ((++prescaler & 7) == 0)
        {
        Beeper();
        if (key_debounce_time) key_debounce_time--;
        Timer++;    /* advances every 8 timer interrupts = 1 mSec */
        }
    }
/*
    #FUNCTION: InitDisplay
*/
void InitDisplay(void)
    {
    DISPLAY_POWER = 0;   /* Turn on power to the display */
    WR_DISPLAY_CMD = 0x01;    /* Display clear */
```

```
   WaitForDisplay();
   WR_DISPLAY_CMD = 0x3c;      /* Function set 8 bit, 2 lines, 5 x 7 dots */
   WaitForDisplay();
   WR_DISPLAY_CMD = 0x0c;      /* Display on, no cursor, no blink */
   WaitForDisplay();
   WR_DISPLAY_CMD = 0x06;      /* Entry mode set */
   WaitForDisplay();
   WR_DISPLAY_CMD = 0x02;      /* home the cursor */
   WaitForDisplay();
   }
/*
      #FUNCTION:   PrintTextAt
*/
void PrintTextAt(short row, short col, char *msg)
   {
   WR_DISPLAY_CMD = 0x80 + row * 64 + col;   /* address the cursor location */
   WaitForDisplay();
   while (*msg)
      {
      WR_DISPLAY_DATA = *msg++;
      WaitForDisplay();
      }
   }

/*
      #FUNCTION:   PrintFloatAt
*/
void PrintFloatAt(short row, short col, float value)
   {
   unsigned int ivalue;
   ivalue = (int)(value * 10);
#if (1)
   buffer[4] = '\0';
   buffer[3] = (ivalue % 10) + '0';
   ivalue /= 10;
   buffer[2] = '.';
   buffer[1] = (ivalue % 10) + '0';
   ivalue /= 10;
   buffer[0] = (ivalue % 10) + '0';
   if (buffer[0] == '0') buffer[0] = ' ';
#else
   sprintf(buffer, "%4.1f", value);
#endif
   PrintTextAt(row, col, buffer);
   }

/*
      #FUNCTION:   PrintIntegerAt
*/
void PrintIntegerAt(short row, short col, int value)
   {
#if (1)
   buffer[2] = '\0';
   if (value < 0)
      {
      buffer[0] = '-';
      value = -value;
      }
   else
      buffer[0] = value / 10 + '0';
   buffer[1] = (value % 10) + '0';
   if (buffer[0] == '0') buffer[0] = ' ';
#else
   sprintf(buffer, "%2i", value);
#endif
```

```c
      PrintTextAt(row, col, buffer);
   }

/*
      #FUNCTION:  PrintLongIntegerAt
*/
void PrintLongIntegerAt(short row, short col, unsigned long value)
   {
#if (1)
   buffer[5] = '\0';
   buffer[4] = (value % 10) + '0';
   value /= 10;
   buffer[3] = (value % 10) + '0';
   value /= 10;
   buffer[2] = (value % 10) + '0';
   value /= 10;
   buffer[1] = (value % 10) + '0';
   value /= 10;
   buffer[0] = (value % 10) + '0';
   if (buffer[0] == '0')
      {
      buffer[0] = ' ';
      if (buffer[1] == '0')
         {
         buffer[1] = ' ';
         if (buffer[2] == '0')
            {
            buffer[2] = ' ';
            if (buffer[3] == '0')
               {
               buffer[3] = ' ';
               }
            }
         }
      }
else
   sprintf(buffer, "%5lu", value);
#endif
   PrintTextAt(row, col, buffer);
   }

/*
      #FUNCTION:  InitAll
*/
void InitAll(void)
   {
   unsigned char i;
   /* compute the big constant */
   Pop_Constant = (unsigned long)((float)(43560 * 144 / RowSpaceInches) / InchesPerTooth);
   if (power_mode != ~power_modecheck)
      {
      /* memory is scrambled, treat as a new battery */ for (i=0; i<MAXSAMPLES; i++)
         {
         Sample[i].NumPlants = -1;
         Sample[i].Population = 0;
         Sample[i].xbar = Sample[i].stdev = 0.0;
         }
      power_mode = 0;   /* because of a new battery, turn it on next */
      }
   power_mode = (power_mode + 1) & 1;
   power_modecheck = ~power_mode;
   /* if the power_mode now calls for power off, then sleep it big */
   if (power_mode == 0)
```

```
    {
    P0 = 0;         /* set all address/data lines low */
    P2 = 0;         /* set upper address decode lines low */
    P1 = 0x20;      /* turn off the display */
    PCON = 0x02;    /* Power down */
    }

/* every powerup starts at the beginning */
S_Num = 0;
/* Setup Timer1 as 128 uSec auto-reload timer */
TH1 = 0x80;     /* reload value to generate interrupt every 128 uSec */
TMOD = 0x20;    /* 8 bit auto-reload mode */
TR1 = 1;        /* free run mode */
ET1 = 1;        /* interrupt source enable */
/* Setup interrupts for Plants and Wheel inputs */
IT0 = 1; /* Wheel on falling edge */
IT1 = 1; /* Plant on falling edge */
/* EX0 = 1; to enable the Wheel interrupt */
/* EX1 = 1; to enable the Plant interrupt */
/* Enable all setup interrupts */
EA = 1;
InitDisplay();
PrintTextAt(1,0,"S=   N=   \xe5=");
}

/*
    #FUNCTION:  InitForNextSample
*/
void InitForNextSample(void)
{
NumWheels = TotalWheels = 0;
Timer = TWheel = TPlant = TFirstWheel = TFirstPlant = 0;
distance = Sx = Sx2 = 0.0;
}

/*
    #FUNCTION:  UpdateDisplayData
*/
void UpdateDisplayData(void)
{
PrintIntegerAt(1,2,S_Num);
PrintIntegerAt(1,7,Sample[S_Num].NumPlants);
if (BTN_POPULATION)
   PrintLongIntegerAt(0,11,Sample[S_Num].Population);
else
   PrintFloatAt(0,12,Sample[S_Num].xbar);
PrintFloatAt(1,12,Sample[S_Num].stdev);
}

/*
    #FUNCTION:  UpdateMode
*/
void UpdateMode(void)
{
switch (operating_mode)
   {
   case STANDBY:
      PrintTextAt(0,0,"STANDBY       ");
      EX0 = 0; /* disable the Wheel interrupt */
      break;
   case SPACING:
      if (BTN_POPULATION)
         PrintTextAt(0,0,"POPULATION=");
      else
         PrintTextAt(0,0,"SPACING   \xf8=");
```

```
            EX0 = 1; /* enable the Wheel interrupt */
            break;
        case RECALL:
            if (BTN_POPULATION)
                PrintTextAt(0,0,"RECALL POP=");
            else
                PrintTextAt(0,0,"RECALL   \xf8=");
            break;
        }
    update_display = TRUE;
    }

/*
        #FUNCTION:    Operating_modeChange
    #DESCRIPTION:    May change current operating mode based on user button presses.
                     Returns TRUE if a mode change occured.
*/
bit Operating_modeChange(bit mode_key, bit next_key)
    {
    switch (operating_mode)
        {
        case STANDBY:
            if (next_key)
                {
                if (S_Num < MAXSAMPLES)
                    {
                    operating_mode = SPACING;
                    S_Num++;
                    InitForNextSample();
                    }
                return TRUE;
                }
            if (mode_key)
                {
                operating_mode = RECALL;
                S_Num = 1;
                return TRUE;
                }
            break;
        case SPACING:
            if (next_key || Sample[S_Num].NumPlants >= MAXPLANTSPERSAMPLE)
                {
                operating_mode = STANDBY;
                return TRUE;
                }
            break;
        case RECALL:
            if (mode_key)
                {
                operating_mode = STANDBY;
                return TRUE;
                }
            if (next_key)
                {
                if (S_Num < MAXSAMPLES)
                    S_Num++;
                return TRUE;
                }
            break;
        }
    return FALSE;
    }

/*
        #FUNCTION:    main
```

```c
*/
void main()
   {
   bit mode_changed, btn_mode, btn_next, btn_population; /* latched button presses */
   InitAll();
   mode_changed = TRUE;    /* first entry causes appropriate display */
   while (FOREVER)
      {
      if (mode_changed)
         {
         mode_changed = FALSE;
         UpdateMode();
         }
      if (update_display)
         {
         update_display = FALSE;
         UpdateDisplayData();
         }
      PCON = 0x01;   /* this sleeps it until next timer tic or other interrupt source */
      if (BTN_POPULATION != btn_population)
         {
         btn_population = BTN_POPULATION;
         mode_changed = TRUE;
         }
      if (BTN_MODE || BTN_NEXT)
         {
         if (key_debounce_time == 0)
            {  /* registered button press, capture whichever button was pressed */
            btn_mode = BTN_MODE;
            btn_next = BTN_NEXT;
            key_beep_time = KEYHONKTIME;
            }
         key_debounce_time = KEYDEBOUNCETIME;
         }
      mode_changed |= Operating_modeChange(btn_mode, btn_next);
      btn_mode = btn_next = FALSE;  /* clear the latched keypresses */
      }
   }
```

We claim:

1. An apparatus for determining plant population, plant spacing, plant spacing variability, and other information regarding row-planted crops in a field, comprising:

a frame;

a first sensor mounted on the frame to sense the presence of plants along a crop row and to produce a plant location signal;

a second sensor mounted to the frame to measure the distance between successive plants in the crop row and to produce a distance signal; and a processor electrically connected to the first and second sensors having first and second inputs for the plant location and distance signals, a calculation component to compute and record the spacing between successive plants for a given one or more portions of one or more crop rows, and to determine plant distribution for a given portion of a row of the fields.

2. The apparatus of claim 1 wherein the first sensor comprises:

a photo emitter emitting a light beam along a path;

a photo detector positioned in the path;

a pivotable arm;

a beam blocking member that is moveable between a beam blocking position and a beam passing position relative to pivoting of the arm; and the plant location signal being generated by the photo detector based on one of a beam blocking or a beam passing position.

3. The apparatus of claim 1 wherein the second sensor comprises:

a photo emitter emitting a light beam along a path;

a photo detector positioned in the path;

a toothed wheel, each tooth of the toothed wheel passing through the path to successively block the beam when the toothed wheel rotates about an axis;

a ground driven tire;

a connection between the tire and the wheel to rotate the wheel about the axis in response to rotation of the tire; and the distance signal being generated from an output of the photo detector.

4. The apparatus of claim 1 further comprising a plant funneling device attached to the frame comprising:

a first generally vertical shield;

a second generally vertical shield;

the first and second shields angled outwardly with respect to one another and to a vertical plane generally coincident with the crop row which passes between the first and second shields; and so that plant stems will be channeled to a rearward constriction between the first and second shields to increase capture and therefore accuracy of sensing of successive plants along the row.

5. The apparatus of claim 4 wherein the funneling device further comprises;

width adjustment components to adjust the closeness of the first and second shields to adjust the sensitivity of the first sensor to various thicknesses of plants.

6. An apparatus for determining plant population, plant spacing, plant spacing variability, and other information regarding row-planted crops in a field, comprising:

a frame;

a ground contacting tire rotatably mounted to the frame;

a toothed wheel operatively connected to the tire and rotatable in accordance with rotation of the tire;

a first optointerrupter having a light path that passes through the path of rotation of the teeth of the toothed wheel;

a first shield mounted to the frame;

a second shield mounted to the frame but spaced apart from the first shield and defining a plant channel between the shields;

an arm pivotably attached to the frame;

the arm normally positioned in the plant channel, but upon contact with a plant of sufficient cross-sectional thickness, deflecting away from the plant channel to a plant-sensing position; and a blocking member attached to the arm, the blocking member causing one of blocking and unblocking a light path of a second optointerruptor when the arm is in the normal position and one of unblocking and blocking the light path when the arm is in the plant sensing position.

7. The apparatus of claim 6 further comprising a processor mounted to the frame.

8. The apparatus of claim 6 further comprising an electrical power source mounted to the frame.

9. The apparatus of claim 6 further comprising width adjustment members associated with the shields.

10. The apparatus of claim 6 further comprising electrical signals from the optointerruptors which indicate the sensing of a plant and the distance between plants.

11. The apparatus of claim 6 further comprising a rotatable member attached at or near an outer end of the arm to contact and rotate upon abutment with a plant.

12. A method of determining plant population, plant spacing, plant spacing variability, and other information regarding row-planted crops in a field, comprising:

(a) sensing a plant along the crop row and producing an electrical signal indicating the sensing of a plant;

(b) measuring the distance between the sensing of a plant and the sensing of a subsequent plant and creating an electrical signal correlated to that distance;

(c) repeating steps (a) through (b) for succeeding plants; and (d) calculating the plant distribution for a given portion of the crop row.

13. The method of claim 12 further comprising sensing the plant with a mechanical part which activates an optointerruptor based on mechanical abutment of the mechanical part with a plant.

14. The method of claim 12 further comprising measuring distance from a ground driven tire that in turn rotates a mechanical part which activates an optointerruptor correlated to distance traveled.

15. The method of claim 12 further comprising calculating plant spacing variability.

16. The method of claim 12 further comprising calculating plant population.

17. The method of claim 12 further comprising interpolating the distance measurement between a plant and a subsequent plant.

18. The method of claim 17 further comprising interpolating the distance measurement by:

(a) creating a plurality of clock pulses;

(b) creating repeating distance signals correlating to the distance traveled;

(c) counting the number of distance signals from the plant and the subsequent plant;
(d) counting the number of clock pulses within one complete distance signal;
(e) counting the number of clock pulses since the last distance signal;
(f) calculating the fractional portion of the last distance signal by dividing the number of clock pulses since the last distance signal by the number of clock pulse within one complete distance signal; and
(g) adding the distance corresponding to the number of distance signals and the fractional portion of the last distance signal.

* * * * *